US008380195B2

(12) United States Patent
Vasudevan et al.

(10) Patent No.: US 8,380,195 B2
(45) Date of Patent: Feb. 19, 2013

(54) METHOD OF CONDUCTING RATE CONTROL, SCHEDULING AND ACKNOWLEDGEMENT IN WIRELESS COMMUNICATION SYSTEM

(75) Inventors: Subramanian Vasudevan, Morristown, NJ (US); Yunsong Yang, London (CA)

(73) Assignee: Alcatel Lucent, Paris (FR)

( * ) Notice: Subject to any disclaimer, the term of this patent is extended or adjusted under 35 U.S.C. 154(b) by 1271 days.

(21) Appl. No.: 10/941,266

(22) Filed: Sep. 15, 2004

(65) Prior Publication Data

US 2006/0056354 A1 Mar. 16, 2006

(51) Int. Cl.
*H04W 36/00* (2009.01)
(52) U.S. Cl. ........ 455/436; 455/437; 455/439; 455/440; 455/441; 455/442; 455/443; 455/444; 455/524; 455/525; 455/560; 455/561
(58) Field of Classification Search .................. 455/436, 455/439–444, 524, 525, 560, 561, 437
See application file for complete search history.

(56) References Cited

U.S. PATENT DOCUMENTS

| | | | | |
|---|---|---|---|---|
| 5,854,785 | A * | 12/1998 | Willey | 370/332 |
| 6,934,264 | B2 * | 8/2005 | Jou | 370/278 |
| 7,013,143 | B2 * | 3/2006 | Love et al. | 455/450 |
| 7,158,796 | B2 * | 1/2007 | Tiedemann et al. | 455/453 |
| 7,336,953 | B2 * | 2/2008 | Kim et al. | 455/438 |
| 7,519,019 | B2 * | 4/2009 | Yoon et al. | 370/328 |
| 2002/0122406 | A1 | 9/2002 | Chillariga et al. | |
| 2003/0152031 | A1 * | 8/2003 | Toskala et al. | 370/236 |
| 2004/0160919 | A1 * | 8/2004 | Balachandran et al. | 370/335 |

FOREIGN PATENT DOCUMENTS

| | | |
|---|---|---|
| JP | 2006140844 A | 6/2006 |
| WO | WO 2005/060277 A2 | 6/2005 |

OTHER PUBLICATIONS

European Search Report dated Dec. 6, 2005 relating to Application No. EP 05 25 5350.

* cited by examiner

*Primary Examiner* — Patrick Edouard
*Assistant Examiner* — Shantell L Heiber
(74) *Attorney, Agent, or Firm* — Carlson, Gaskey & Olds PC

(57) ABSTRACT

A method for transmitting control information from multiple base stations in an active set to a mobile device in a wireless communication system reduces resource consumption by routing information originating from a plurality of active base stations through a single serving base station. The serving base station pools and resolves the information from the active base stations and sends the resolution of the pooled information over a downlink control channel for evaluation and response by the mobile device.

26 Claims, 2 Drawing Sheets

METHOD OF CONDUCTING RATE CONTROL, SCHEDULING AND ACKNOWLEDGEMENT IN WIRELESS COMMUNICATION SYSTEM

BACKGROUND OF THE INVENTION

1. Field of the Invention

This invention relates to wireless communication systems.

2. Description of the Related Art

Communication systems, such as wireless systems, are designed to meet various subscriber demands. Service providers continuously seek ways to improve the overall performance of the communication system. In the past, wireless communication systems have been used for voice communications, but more recent technological developments have allowed high speed data transmission as well. As wireless communications become more and more popular for subscribers to obtain data (i.e., e-mail or information from the internet), communication systems should be capable of a higher throughput and be tightly controlled to maintain a high quality of service. Communication is conducted according to any desired communications standard, such as the Universal Mobile Telecommunications Standard (UMTS) or a CDMA standard.

As is known in the art and shown generally in FIG. 1, a wireless communication system 100 serves a service coverage area that is divided into cells 101 having one or more sectors 102. Base stations 104, 104a are associated with the sectors 102 in at least one cell 101. Adaptive modulation and coding allows selection of an appropriate transport format (e.g., modulation and coding) for the current channel conditions seen by the user. There are two directions of data flow in such systems; communications from the base station 104, 104a to a mobile device 106 are considered to flow in a downlink direction, while communications originating at the mobile device 106 and sent to the base station are considered to flow in an uplink direction. A given base station is considered a serving base station 104a if it is currently transmitting data to the mobile device 106. These base stations, and other base stations 104, 104a that may be chosen by the mobile device 106 as a candidate for acting as a new serving base station, are collectively known as the "active set" of base stations. Thus, the serving base station 104a is considered to be a member of the active set of base stations. Control information, such as information required for power control of transmissions by the mobile device 106, is transmitted by the entire active set of base stations.

The CDMA standard, and specifically CDMA200 Revision D, incorporates several additional air-interface control mechanisms that control transmissions from the mobile device 106 on the uplink to a given base station 104, 104a. The control mechanisms allow the base stations 104 in the system 100 to perform various functions with respect to mobile device 106 transmissions. These functions include schedule grants that schedule the mobile device 106 for data transmission (i.e., direct the mobile device 106 to transmit up to a selected data rate and/or power level), rate control commands that indicate any changes in transmission rates of the mobile devices 106, and acknowledgements that acknowledge successful or failed reception of transmissions from the mobile devices 106.

As is known in the art, the mobile device 106 communicates with just the serving base station 104a when no other base stations are in the active set. When the mobile device 106 starts communicating concurrently with other base stations (i.e., the active base stations 104, including the serving base station as well as additional base stations), the mobile device 106 is considered to be in a handoff situation. A signaling message, such as a Universal Handoff Direction Message (UHDM), is sent to the mobile device 106 by one or more of the base stations 104, 104a to move the mobile device 106 into a handoff state.

As shown in FIG. 1, the mobile device 106 conforming to a CDMA standard, such as the CDMA2000 Revision D standard, receives a scheduling grant from only the serving base station 104a. However, rate control commands are sent from all active set base stations, while acknowledgements may be sent from some or all of the active base stations 104, but always the serving base station 104a.

Typically, three separate shared downlink control channels at each base station 104, 104a are used to communicate the schedule grants, rate control commands, and acknowledgements from the base stations 104, 104a to the mobile devices 106. Further, a specific sub-channel on each of these channels communicates control information to a given mobile device 106. The identity of these shared downlink control channels and code or time-slot sub-channels must be communicated to the mobile device 106 for each base station in the active set even if the system 100 does not intend to send scheduling, rate control, and/or acknowledgement information from all of the active base stations 104 104a. This is because the mobile device 106 or a controller in the system 100 may change the base station acting as the serving base station 104a at any time.

One possible method to communicate the scheduling, rate control, and/or acknowledgement channel and sub-channel identities is to communicate the channel and sub-channel identities to the mobile device by including this information in the UHDM. This method is enabled by the standard. Setting the identities of the forward control channels of each active base station 104, 104a a priori via the UHDM when the mobile device 106 moves into the handoff state requires each base station 104, 104a communicating with the mobile device 106 to reserve some or all of its capacity on the control channels for communication on the downlink. Further, sending the control channel identity information via a message, such as the UHDM, imposes a substantial cost in down link power in addition to forcing each base station 104, 104a to reserve downlink Walsh codes, bit positions, etc.

For mobile devices 106 in the handoff state, each active set base station 104, 104a may send control information that is the same as or different from control information from other base stations 104, 104a receiving communications from the same mobile device 106. For example, one of the active base stations 104, 104a may send a positive acknowledgement when it has successfully received a transmission from the mobile device 106 while at the same time another active base station 104, 104a may respond with a negative acknowledgement. Similarly, one base station 104, 104a may ask the mobile device 106 to increase its transmission rate while at the same time another base station 104, 104a may ask the mobile device 106 to decrease its transmission rate. The mobile device 106 evaluates the information from the multiple base stations and sets its response (e.g., transmission rate, re-transmissions, etc.) based on this evaluation.

Not all of the base stations 104, 104a, however, that are transmitting over the shared downlink control channels know the quality of their respective downlinks to the mobile device 106. This is because the mobile device 106 typically provides downlink quality reports only for a single base station sector 102 (i.e., the serving sector). As a result, other base station sectors 102 do not have any associated downlink quality reports that would be used to allocate appropriate power levels on their downlink control channels to the mobile device.

There is a desire for a method that allows control information from multiple base stations to be transmitted to a single mobile device without excessively reducing resources available for other traffic between the base stations and the mobile device.

SUMMARY OF THE INVENTION

The present invention is directed to a method for transmitting control information from multiple base stations to a mobile device in a wireless communication system without consuming excessive resources, either over the air or on the wireless network infrastructure. Generally, the invention may reduce resource consumption by sending information corresponding to one or more active base stations through at least a single serving base station. The information includes, for example, schedule grant(s), rate control command(s), and acknowledgement(s) from the base stations as well as the identity of the channel(s) and sub-channel(s) on which they may be transmitted to the mobile device. The serving base station pools and resolves the information that would ordinarily have been sent individually by each of the active base station(s) to the mobile device. The serving base station may then send the resolution of the pooled information to the mobile device.

By transmitting control information from some or all of the active base stations through one serving base station rather than through the individual active base stations, the invention allows information from multiple base stations to reach the mobile device while minimizing the power and bandwidth needed to transmit this information.

DETAILED DESCRIPTION

Figure 1:
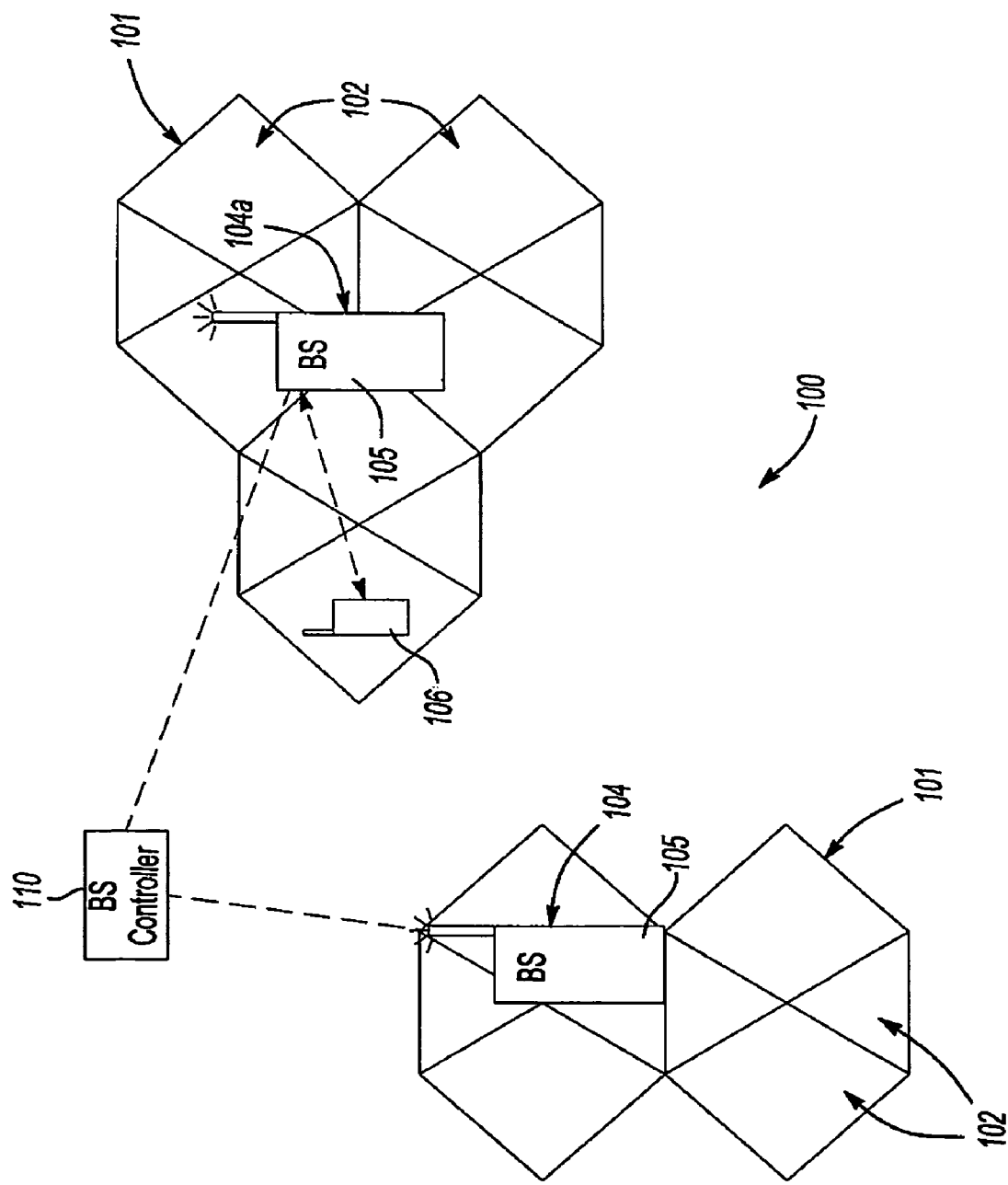
FIG. 1 is a representative diagram of a wireless communication system.

FIG. 1 is an illustrative example of the wireless communication system 100 in which the inventive method can be executed. As explained above, the system 100 is divided into cells 101 having multiple sectors 102 corresponding with different geographic areas, with each base station 104 being associated with one or more sectors 102. The base station 104 and the mobile device 106 can distinguish among the sectors 102 via any known metric implemented by, for example, a baseband processing application specific integrated circuit (ASIC) 105 in the base station 104. For example, each sector 102 may be associated with a particular Walsh symbol (also called a "Walsh cover"), which would be used by the base station 104 and the mobile device 106 to identify each sector 102.

The system 100 may also include a central base station controller 110 that can communicate with all of the base stations 104 in the system 100 and handle data corresponding to multiple sectors 102 and/or multiple base stations 104. For purposes of the detailed description below, the base stations 104 that are either chosen or may be chosen by the mobile device 106 to transmit data at a given time are called "active base stations," while the base station 104 that is currently transmitting data to the mobile device 106 is considered to be a "serving base station" 104a. Note that the serving base station 104a is considered to be one of the active base stations 104 as well.

To control the data transmissions made by the mobile device 106, the current serving base station 104a sends the scheduling grants to the mobile device 106. Additionally, rate control and acknowledgement information are potentially conducted by some or all of the active base stations 104, 104a. As noted above, each active base station 104, 104a may communicate a schedule grant (if it is a serving base station 104a), rate control command, and/or acknowledgement to the mobile device 106 via shared downlink control channels.

The mobile device 106 has the option of switching between the active base stations 104 to select which base station 104 will act as the serving base station 104a from which it will receive data. When this happens, there needs to be a transfer of the channel or sub-channel over which the mobile device 106 receives the scheduling, acknowledgement and rate control messages from the selected serving base station 104a. To do this, the mobile device 106 must know which channel or sub-channel to check to look for this information. Thus, as noted above, the identity of these shared downlink control channels must be communicated to the mobile device 106 even if the system 100 does not intend to send scheduling, rate control, and/or acknowledgement information from all of the active base stations 104 because the mobile device 106 or the controller 110 may change the base station 104 that acts as the serving base station 104a.

Figure 2:
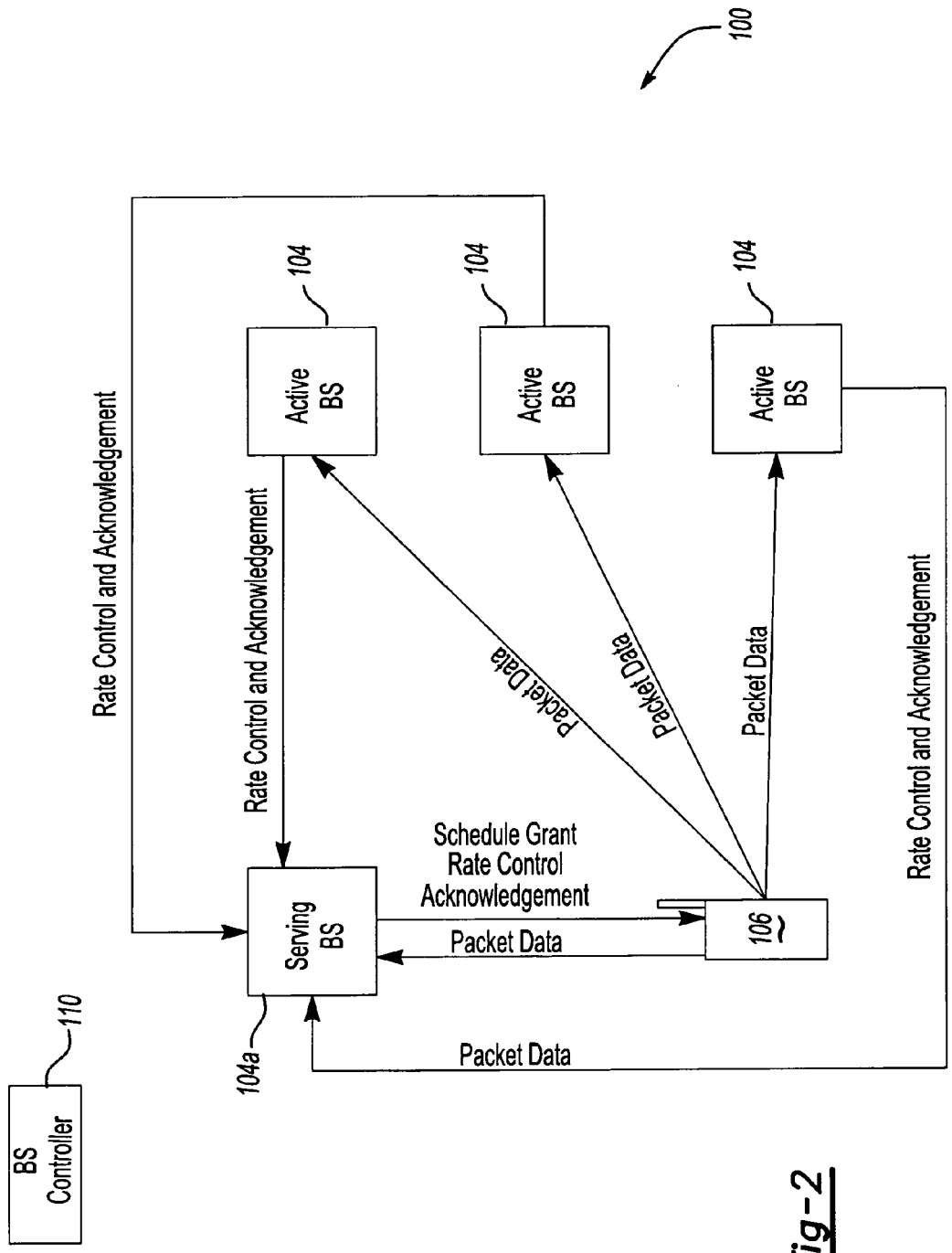
FIG. 2 is a representative diagram of the wireless communication system illustrating one example of information transmitted in the system according to one embodiment of the invention.

Rather than having each base station 104, 104a individually send the shared channel identities via the UHDM at the time the mobile device enters into soft handoff, the first part of the invention involves sending the control channel identity information from the active base stations 104 to the serving base station 104a instead of the mobile device at the time the mobile indicates an intention to switch the serving sector. The serving base station 104a then pools and resolves the received information together and sends the resolved information through any available control channel to the mobile device 106 (FIG. 2).

One example of resolving information, in a case where only the serving sector sends the rate control and acknowledgement commands, is when the serving sector selects the sub-channel identities for the sector the mobile device 106 has indicated it will switch to; in this case, the serving sector sends only those sub-channel identities to the mobile device 106. In this scheme, only the serving base station 104a needs to reserve and consume resources to transmit this information to the mobile device 106. Further, only the sub-channels that are in use are reserved, and only at the time when the mobile device 106 indicates a switch.

The second aspect of this invention relates to the routing of the actual rate control and acknowledgement information to the mobile device 106 via the serving base station 104a. The non-serving base stations 104 compute this control information but do not transmit the control information directly to the mobile device 106.

More particularly, the mobile device 106 in the handover state sends packet data transmissions to the active base stations 104, which includes the serving base station 104a from which it is currently receiving data. In this particular example, the active base stations 104, 104a send positive acknowledgements and rate reduction commands, but any information in response to the mobile device 106 transmission is possible. Instead of sending the acknowledgement and rate control command directly to the mobile device 106, however, the non-serving active base stations 104 send them to the serving base station 104a. Thus, the active base stations 104 do not send any information via their respective downlink control channels to the mobile device 106.

The serving base station 104a then pools the information it receives from the active base station 104. As part of the pooling process, the serving base station 104a may evaluate the information it receives from the non-serving active base stations 104 as well as the information it generates itself and resolve the pooled information through any rules specified by the standard used by the system 100.

In one example, the serving base station 104a may receive acknowledgements from multiple base stations 104 where one or more of the multiple base stations 104 each send a positive acknowledgement (indicating successful receipt of a transmission from the mobile device 106) and the remaining base stations 104 each send a negative acknowledgement (indicating unsuccessful receipt of the transmission). Note that a negative acknowledgement may not necessarily be sent in every case; instead, the negative acknowledgement may be inferred at the serving base station 104a by the absence of an indication from the remaining base stations 104.

Pooling the information from the active base stations 104 into the serving base station 104a also allows the system 100 to take advantage of soft handoff gains, that is, the gain achieved when a non-serving active base station 104 receives a transmission that is not received successfully by the serving base station 104a. In such a case, one or more of active base stations 104 that successfully received the mobile device transmission (and thereby would send a positive acknowledgement) sends the received transmission to the serving base station 104a. The serving base station 104a then sends a positive acknowledgement to the mobile device 106 instead of a negative acknowledgement. This is possible because the mobile device 106 only needs one base station 104 in the group of active base stations 104, 104a to receive its information accurately for proper communication. In other words, the serving base station 104a can send a positive acknowledgement to the mobile device 106 whenever any one of the active base stations 104, including itself, wishes to send a positive acknowledgement. Using a similar approach, the transmission rate of the mobile device 106 may be lowered by the serving base station 104a if either any one of the non-serving active base stations 104 or the serving base station 104a itself requires a reduction in mobile transmission rate or power level.

Note that in some cases a non-serving active base station 104 may experience a reporting delay when reporting its acknowledgement of the serving base station 104a and report too late for the serving base station 104a to alter its acknowledgement (e.g., from a negative acknowledgement to a positive one). If this occurs, retransmission of a given data packet by the mobile device 106 may be dictated by the success or failure in decoding the transmission in the serving base station 104a. The positive acknowledgement from the non-serving active base station(s) 104, however, is still helpful to the serving base station 104a because the delayed positive acknowledgement can still be used by the serving base station 104 to send a positive acknowledgement to the mobile device 106 as long as the active base station 104 is still receiving retransmissions from the mobile device 106 for the same data packet. Even if the serving base station 104a receives the positive acknowledgement from the non-serving active base station 104 too late to indicate a positive acknowledgement to the mobile device 106, the serving base station 104a can still use this information to prevent a later request for an unnecessary retransmission of the data packet to the mobile device 106. A similar approach to handling reporting delays can be used with respect to rate control instructions from the non-serving active base stations 104; these instructions can be used by the serving base station 104a to reduce the granted rate (and therefore power) to the mobile device 106.

When the mobile device 106 indicates its intention to switch to a new serving base station, the current serving base station 104a serving the mobile device 106 tells the mobile device 106 which channels or sub-channels the mobile device 106 needs to monitor to obtain the acknowledgement and/or rate control information from the new serving base station it targeted. The intention to switch may be detected by any of the active base stations 104 and is relayed back to the central controller 110. The central controller 110 notifies all of the active base stations 104 regarding the intention to switch, causing them to start sending their acknowledgement and/or rate control information to the new serving base station targeted by the mobile device for consolidation. When the mobile device 106 finally switches to the new serving base station, the mobile device 106 receives the pooled information from the active base stations 104 from the new serving base station.

In one example, the active base stations 104 do not need to send both positive and negative acknowledgements and/or both rate increases and rate decreases to the serving base station 104. Instead, the serving base station 104a only needs to know when one of the active base stations 104 wishes to send a positive acknowledgement or requires a rate decrease (i.e., the serving base station 104a does not need to be notified if the base stations 104 wishes to send a negative acknowledgement or requires a rate increase because this information is superfluous and does not warrant a change in any part of the system 100. By limiting information sent to the serving base station 104a in this manner, the invention further reduces the power and bandwidth needed to provide information from the active base stations 104 to the serving base station 104a.

By pooling control information from multiple base stations 104 into the serving base station 104a and using only the serving base station 104a to send the control information to the mobile device 106, the invention reduces both bandwidth and power resources needed to transmit information corresponding to multiple base stations 104. Moreover, limiting the information transmitted to the serving base station 104a for pooling reduces backhaul bandwidth usage.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method of wireless communication comprising:

communicating over at least one traffic channel between a serving base station and a mobile device;

receiving in the serving base station at least one transmission from at least one active base station, the at least one transmission being responsive to the at least one active base station receiving a transmission from the mobile device to the at least one active base station, the at least one active base station limiting information sent to the serving base station by sending the at least one transmission only if the at least one transmission is a positive acknowledgment or a rate decrease request and not communicating a negative acknowledgement or a rate increase request to the serving base station;

pooling said at least one transmission in the serving base station to form pooled information;

resolving the pooled information to obtain resolved information; and transmitting the resolved information from the serving base station to the mobile device.

2. The method of claim 1, wherein said at least one transmission comprises at least one selected from the group consisting of a schedule grant and at least one control channel identity.

3. The method of claim 2, wherein the serving base station is considered another active base station, and wherein the scheduling grant is transmitted to the mobile device by the serving base station.

4. The method of claim 1, wherein the serving base station transmits the resolved information through a control channel associated with the serving base station.

5. The method of claim 1, wherein the resolving step is conducted according to at least one rule specified by a system standard.

6. The method of claim 1, wherein the resolving step comprises determining which one of a plurality of active base stations will act as a new serving base station.

7. The method of claim 1, wherein said at least one active base station comprises a plurality of active base stations.

8. The method of claim 7, wherein the serving base station transmits the positive acknowledgement to the mobile device in the transmitting step if any one of the plurality of active base stations sends the positive acknowledgement to the serving base station.

9. The method of claim 8, wherein the serving base station changes its own acknowledgement from a negative acknowledgement to the positive acknowledgement if any one of the plurality of active base stations sends the positive acknowledgement.

10. The method of claim 8, wherein the serving base station uses the positive acknowledgement to prevent an unnecessary retransmission of a data packet from the mobile device.

11. The method of claim 7, wherein the serving base station transmits the rate decrease request to the mobile device in the transmitting step if any one of the plurality of base stations sends the rate decrease request to the serving base station.

12. The method of claim 7, wherein the plurality of active base stations send at least one control channel identity corresponding only to the active base stations that will be actively communicating with the mobile device.

13. The method of claim 1, wherein the at least one transmission from said at least one active base station comprises information to be communicated to the mobile device.

14. The method of claim 1, wherein the at least one active base station will not send the at least one transmission unless it is one of the positive acknowledgment or the rate decrease request.

15. A method of wireless communication comprising:

communicating over at least one traffic channel between a serving base station and a mobile device;

transmitting at least one communication from the mobile device to at least one active base station that is distinct from the serving base station;

receiving in the mobile device resolved information from the serving base station, wherein the resolved information is resolved from pooled information containing at least one transmission sent from said at least one active base station to the serving base station, the transmission sent from said at least one active base station to the serving base being responsive to the communication from the mobile station, the at least one transmission including limited information sent from said at least one active base station to the serving base station, the limited information comprising only at least one of a positive acknowledgment or a rate decrease command, the limited information not including a negative acknowledgement or a rate increase command; and switching based on the resolved information.

16. The method of claim 15, wherein said resolved information comprises at least one selected from the group consisting of a schedule grant and at least one control channel identity.

17. The method of claim 16, wherein the receiving step includes receiving the scheduling grant from the serving base station.

18. The method of claim 15, wherein said at least one active base station comprises a plurality of active base stations and wherein the receiving step comprises receiving the positive acknowledgement if any one of the plurality of active base stations sends the positive acknowledgement to the serving base station.

19. The method of claim 15, wherein said at least one active base station comprises a plurality of active base stations and wherein the receiving step comprises receiving the rate decrease request if any one of the plurality of base stations sends the rate decrease request to the serving base station.

20. The method of claim 15, wherein the receiving step comprises receiving at least one control channel identity corresponding only to at least one active base station that will be actively communicating with the mobile device.

21. The method of claim 15, wherein the at least one transmission from said at least one active base station comprises information to be communicated to the mobile device.

22. The method of claim 15, wherein the at least one active base station will not send the at least one transmission unless it is one of the positive acknowledgment or the rate decrease command.

23. A method of wireless communication with at least one active base station that is a member of an active set of base stations of at least one mobile device, the method comprising:

receiving in a serving base station at least one transmission from said at least one active base station, the at least one transmission being responsive to a transmission from the mobile station to the at least one active base station, the at least one active base station limiting information sent to the serving base station by sending the at least one transmission only if the at least one transmission is a positive acknowledgment or a rate decrease command and not communicating a negative acknowledgement or a rate increase request to the serving base station;

pooling said at least one transmission in the serving base station to form pooled information;

resolving the pooled information to obtain resolved information; and transmitting the resolved information from the serving base station to the mobile device.

24. The method of claim 23, wherein the resolving step comprises determining which of a plurality of active base stations will act as a new serving base station.

25. The method of claim 23, wherein the at least one transmission from said at least one active base station comprises information to be communicated to the mobile device.

26. The method of claim 23, wherein the at least one active base station will not send the at least one transmission unless it is one of the positive acknowledgment or the rate decrease command.

* * * * *